United States Patent Office 3,441,526
Patented Apr. 29, 1969

3,441,526
PREPARATION OF GRAFT POLYMERS OF SYNTHETIC POLYAMINO ACIDS ON NATURAL POLYHYDROXY COMPOUNDS, THEIR DERIVATIVES AND SYNTHETIC POLYHYDROXY POLYMERS
Albert Ziikha and Yair Avny, Jerusalem, Israel, assignors to The State of Israel, Prime Minister's Office, Jerusalem, Israel
No Drawing. Continuation of application Ser. No. 372,366, June 3, 1964. This application Oct. 25, 1967, Ser. No. 678,496
Claims priority, application Israel, June 10, 1963, 19,380
Int. Cl. C08g 20/08, 41/07; C08b 15/06
U.S. Cl. 260—9        16 Claims

ABSTRACT OF THE DISCLOSURE

New graft polymers of synthetic polyamino acids (polypeptides) are prepared on natural polyhydroxy polymers such as cellulose, starch, their derivatives and modified forms; on synthetic polymers, having free hydroxyl groups, such as polyvinyl-alcohol, polyvinyl esters, and their derivatives, polyglycol ethers having hydroxyl groups, etc.; and on synthetic graft polymers of vinyl monomers, epoxides, etc. on natural and synthetic polyhydroxy polymers by the interaction of the N-carboxyanhydride derivatives of amino acids with the hydroxyl groups of the polymer backbone or with the alkali metal-oxide derivatives of these hydroxyl groups, which serve as initiators of polymerization.

This application is a continuation of copending application Serial No. 372,366 filed June 3, 1964 and now abandoned.

This invention relates to the preparation of new graft polymers of synthetic polyamino acids (polypeptides) on natural polyhydroxy polymers such as cellulose, starch, their derivatives and modified forms; on synthetic polymers, having free hydroxyl groups, such as polyvinyl-alcohol, polyvinyl esters, and their derivatives, polyglycol ethers having hydroxyl groups, etc.; and on synthetic graft polymers of vinyl monomers, epoxides, etc. on natural and synthetic polyhydroxy-polymers.

The method of obtaining these graft polymers is based on interaction of the N-carboxyanhydride derivatives of amino acids with the hydroxyl groups of the polymer backbone or better with the alkali metal-oxido derivatives of these hydroxyl groups, which serve as initiators of polymerization.

Graft polymers of the general structure

```
A—A—A—A—A
    |       |
    B       B
    |       |
    B       B
``` are known to have special properties depending on the structure of the backbone constituted by monomers A and the attached side chains comprising monomers B.

The employment of an N-carboxyanhydride (I) in the prepartion of a synthetic polyamino acid (polypeptides) is known (Bamford, Elliot & Hanby, "Synthetic Polypeptides," (Academic Press, N.Y., 1956; Katchalski & Sela, "Advances in Protein Chemistry," vol. XIII, 1958, Academic Press, N.Y.).

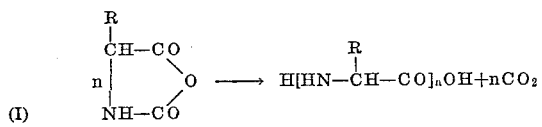

They can be polymerized by several methods such as: Heating in vacuum or interaction with alcohols (T. Curtius & W. Sieber, Ber. 55, 1543 (1922)), amines, water, alkalies and alkali metaloxido derivatives of simple alcohols such as of methanol (E. R. Blout & R. H. Karlson, J. Amer. Chem. Soc., 89, 941 (1956); E. R. Blout, R. H. Karlson, P. Doty, B. Hargitay, J. Amer. Chem. Soc., 76, 4492 (1954)). Free amino groups of polypeptides also initiate polymerization (Katchalski & Sela, "Advances in Protein Chemistry," vol. XIII, 1958, Academic Press, N.Y.).

Primary and secondary amines act as initiators by amide formation as follows:

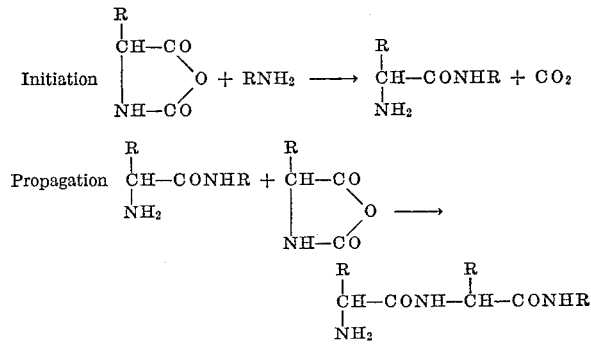

Initiation of polymerization by alkoxides has been shown to occur by the following mechanism (Idelson & Blout, J. Amer. Chem. Soc., 80, 2387 (1958)):

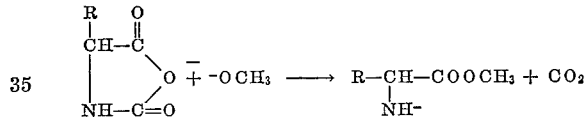

The $CH_3O$ is attached as an ester group and the $NH^-$ formed propagates the polymerization as shown above.

In the above formulae R stands for H or a hydrocarbon radical that may be substituted.

In accordance with the present invention it has now been found possible to use natural and synthetic polyhydroxy polymers and their derivatives, having free —OX groups where X is either H or an alkali metal, as initiators for the polymerization of N-carboxy anhydrides of amino acids, and at the same time as backbone polymers, thus obtaining graft polymers. A possible mechanism for their formation is:

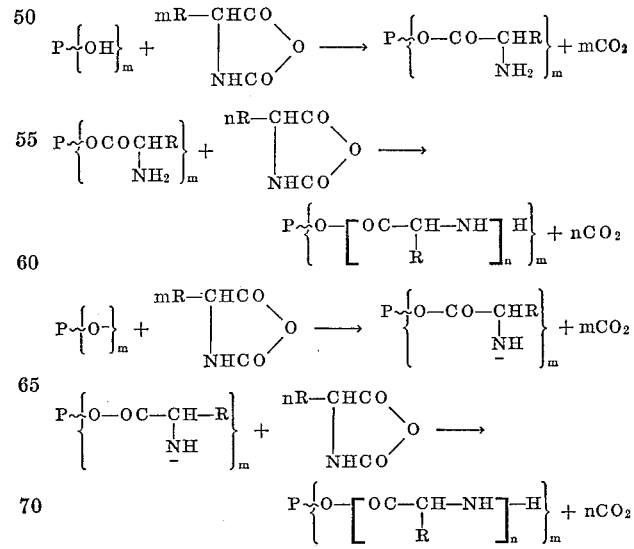

where P stands for polymer having hydroxyl groups and R is H or a hydrocarbon radical that may be substituted.

The invention thus provides a method for the preparation of a graft polymer of a synthetic polyamine acid on a natural or synthetic polyhydroxy polymer or a derivative thereof, comprising the step of reacting an N-carboxyanhydride of an amino acid with a natural or synthetic polyhydroxy polymer or a functional derivative or a graft polymer thereof having free —OX groups where X is H or an alkali metal.

Preferably, the above reaction is carried out in a suitable solvent.

The graft polymers obtained in accordance with the present invention are new polymeric materials.

Whether the polyhydroxy polymer is used in the method according to the invention in the free hydroxy or in the alkali metal-oxido form depends on the nature of the N-carboxyanhydride. Where the polyhydroxy polymer is to be used in the alkali metal-oxido form, the latter will have to be prepared from the corresponding hydroxy compound. The conversion of free hydroxyl groups of natural polyhydroxy compounds, such as starch and cellulose, into the corresponding alkali metal-oxido form has been extensively studied. The reaction between concentrated alkali metal hydroxide solutions and cellulose has been known to form alkali metal-oxido cellulose of known metal content and structure (G. Champetier and O. Yovanovitch, J. Chim. Phys., 48, 587 (1951); S. Bleshinsku and S. Lozitskaya, Trudy Khim. Inst. Kirgis Filial Akad Nauk SSSR No. 4, 73 (1951); K. M. Gavar, E. R. Lasure and D. V. Tieszen, U.S. 2,572,923, Oct. 30, 1951). Alkali metal-oxido cellulose is also obtained by reaction of cellulose with alkali metal in liquid ammonia.

These general methods for the preparation of alkali metal-oxido derivatives have disadvantages for the graft polymerization of N-carboxyanhydrides. The presence of water, alcohol or excess alkali with the alkali metal-oxido derivatives might either prevent graft polymerization or lead to the formation of homopolymers with corresponding loss in monomer and complicated separations of the graft polymers from the homopolymers. The preparation of the alkali metal-oxido derivatives in liquid ammonia has also certain disadvantages. In the case of cellulose acetate and nitrocellulose, there is degradation of the polymers due to reduction (Andrieth and Kleinberg, "NonAqueous Solvents," Wiley & Sons, New York, 1952, p. 111). The presence of ammonia will lead to the formation of homopolyamino acids, as ammonia can serve as initiator of polymerization of N-carboxyanhydride.

This requires that all the solvent (liquid ammonia) must be evaporated completely before that graft polymerization can be carried out.

In this invention we have used the method described in Israel patent application No. 19,379, June 10, 1963, for the preparation of alkali metal-oxido derivatives of the natural and synthetic polyhydroxy polymers, and especially those derivatives which are soluble in organic solvents such as tetrahydrofuran, dimethylformamide, dimethylsulfoxide, ethers, etc. By this method the polyhydroxy polymer, either in suspension or better in solution, is reacted with an addition compound of an alkali metal with a polycyclic aromatic hydrocarbon such as naphthalene, anthracene, etc., in a suitable solvent. This reaction proceeds as follows (Paul, Lipkin and Weisman, J. Am. Chem. Soc., 78, 116 (1956)):

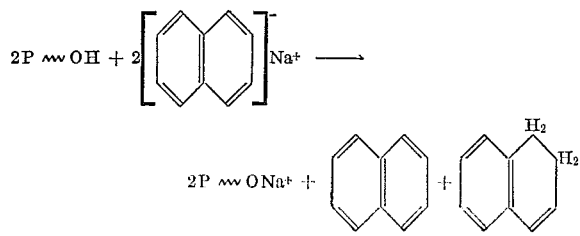

When the polyhydroxy polymer is in solution, the reaction is completed almost immediately.

This method for the preparation of the alkali metal-oxido derivatives used in the graft polymerization has also the following advantages:

(1) The alkali metal addition compounds are coloured, and the end of the reaction is easily seen from disappearance of the colour. This, it is possible to graft polymerize directly, since no residual catalyst is present that can cause homopolymerization.

(2) The by-products in the reaction are only polycyclic hydrocarbons and their dihydroderivatives, which do not interfere in subsequent graft polymerization.

(3) It is possible to convert a certain definite fraction of the hydroxyl groups of the polyhydroxy polymer by the addition of a calculated quantity of the alkali metal polycyclic hydrocarbon measured from a solution, standardized by acid-base titration. This is especially advantageous in that the concentration of the initiator usually determines the degree of polymerization of the resulting polymers.

(4) In this method the alkali metal-oxido derivative is formed under conditions suitable for subsequent direct polymerization on N-carboxyanhydrides.

The amino acid-N-carboxyanhydrides that can be graft polymerized in accordance with the invention include those derived from amino acids containing other functional groups in addition to their amino and carboxyl groups. In other words, any amino acid which gives an N-carboxyanhydride is encompassed by the present invention provided the N-carboxyanhydride is capable of reacting with hydroxy or alkali metal-oxido compounds. For example, the N-carboxyanhydrides derived from $\alpha$-amino acids corresponding to the following generic formula:

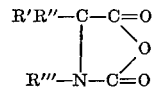

where R' and R" may each be H or an unsubstituted or substituted alkyl, aryl or aralkyl, and R''' is H, alkyl, aryl or aralkyl, can be used in accordance with the invention. Examples are N-carboxyanhydrides derived from glycine, alanine, leucine, phenylalanine, tryptophan, histidine, glutamic, aspartic acid, $\gamma$-benzylglutamate, lysine, serine, sarcosine, and tyrosine.

Examples of further N-carboxyanhydrides of $\alpha$-amino acids that can be used in accordance with the invention and which do not correspond to the above generic formula are those of proline, hydroxyproline and cyclopropane amino carboxylic acid.

N-carboxyanhydrides of $\beta$-amino acids can also be used in accordance with the invention, such as those of $\beta$-aminobutyric acid, N-phenyl-$\beta$-alanine, other N-alkyl $\beta$-amino acids.

From among the aromatic amino acids whose N-carboxyanhydrides may be used in accordance with the invention there may be mentioned anthranilic acid.

The graft polymerization initiated by the alkali metal-oxido derivatives of the polyhydroxy polymers is faster, better controlled and gives greater yields than that initiated by the free hydroxyl groups of the polymers. Consequently, these alkali metal-oxido derivatives will be preferred whenever possible. Most desirable for the purposes of the present invention are the alkali metal-oxido derivatives of starch and cellulose which are described more closely in Israel patent application No. 19,379, June 10, 1963.

Yields from 70–100% based on the N-carboxyanhydride used as starting material are obtained in accordance with the invention. Usually no homopolyamino acid is obtained besides the graft polymer which is a great advantage as there is no loss of monomer and no difficulty encountered with the isolation of the pure graft polymer. This is in accordance with the known mechanism of amino acid N-carboxyanhydride polymerization, where chains can start only from initiation by a hydroxy or alkali metal-alkoxy compound. In polymerizations carried out in complete solution, unreacted parent polymer is also usually present only in very small amounts, and can be minimized still more by increasing the amount of N-carboxyanhydride polymerized. In this manner it is possible to obtain in homogeneous polymerization essentially only the graft polymers which are about 90% or more pure.

In the graft polymerization of an amino acid N-carboxyanhydride in accordance with the present invention, the average molecular weight of the product is proportional to the molar ratio of the N-carboxyanhydride to the polyhydroxy polymer either in the free hydroxy or alkali metal-oxido form. This permits the preparation of graft polymers of synthetic polyamino acids on polyhydroxy polymers whereby both the number and the length of the grafted side chains can be controlled, depending on the fraction of the hydroxyl groups converted to alkali metal-oxido groups and the amount of N-carboxyanhydride used.

It is possible in accordance with the invention to prepare graft polymers of copolymers of amino acids on the polyhydroxy polymers by polymerizing mixtures of N-carboxyanhydrides of two or more amino acids on the polyhydroxy polymer or on its alkali metal-oxido derivative. Also it is possible in accordance with the invention to carry out the grafting in successive steps using in each step a different N-carboxyanhydride. In this manner the final product is a polyhydroxy polymer grafted with two or more polyamino acid chains.

It is furthermore possible in accordance with the invention to control the amount of the polyamino acids in the copolymers so as to produce desired physical and chemical properties.

In principle, any polymer having hydroxyl groups either free or converted to alkali metal-oxido groups which can initiate the polymerization of N-carboxyanhydrides of amino acids, can be used as polymer backbone on which polyamino acids can be grafted. Such polymers include besides polyhydroxy homopolymers also graft polymers of polyvinyl monomers, polyepoxides, polyamides, polyacetals, etc., on natural and synthetic polyhydroxy polymers with residual free hydroxyl groups converted, if desired, into the corresponding alkali metal-oxido groups. Thus, a new family of graft polymers having both polyamino acids and vinyl polymers or polyepoxides, etc. as side chains may be prepared. In other words, in accordance with the present invention it is possible to graft polymers onto graft polymers. Examples of graft polymers that may be used for further grafting with polyamino acid chains in accordance with the invention are graft polymers of polystyrene-cellulose, polymethylmethacrylate-cellulose, polymethylmethacrylate-starch, polyacrylonitrile cellulose acetate, polymethacrylonitrile cellulose-acetate and polyethyleneoxide-cellulose.

The properties of the graft polymers may be modified as required by reacting the functional groups of the polyamino side chains with suitable reagents. Thus, graft polymers according to the invention in which the polyamino acid chains have free carboxyl groups, such as polyglutamic acid, may be reacted with suitable reagents and its carboxyl groups converted to esters, amides, etc.

The graft polymers that can be prepared in accordance with the present invention have a wide range of application depending on the parent polymer backbone and the grafted side chains. For example, a graft polymer of a suitable polyamino acid on cellulose acetate may have improved properties as regards fiber formation as compared with cellulosic fibers. The dyeing properties of the cellulosic fibers is also improved by graft polymerization. Likewise, the solubility of the non-grafted polymer or copolymer may be modified in a predetermined desired manner by grafting in accordance with the invention.

Graft polymers of polyamino acids on cellulose acetate or nitrate may also have special uses in connection with photography and the film industry. These graft polymers may have certain advantages, as they incorporate both the polyamino acid and the cellulose acetate or nitrate used in films.

Purification of the graft polymers.—The graft polymers are purified by suitable treatment as can be seen from the following examples:

Poly-DL-phenylalanine-cellulose acetate graft polymer is purified by extraction with acetone to remove unreacted cellulose acetate, and with nitrobenzene to remove homopoly-DL-phenylalanine. The remaining polymer is a graft polymer free from both cellulose acetate and poly-DL-phenylalanine. It shows the characteristic absorptions in the infrared of both cellulose acetate and poly-DL-phenylalanine. It gives positive biuret reaction due to the polyamino acid component. The percentage of polyphenylalanine in the graft polymer is calculated from nitrogen analyses of the polymer.

Poly-$\gamma$-benzyl-L-glutamate-cellulose acetate graft polymer is purified by extraction with benzene to remove homopoly-$\gamma$-benzyl-L-glutamate and then with acetone-petroleum ether mixtures to remove unreacted cellulose acetate. The remaining insoluble polymer is the graft polymer.

Poly-DL-phenylalanine-polyvinyl alcohol graft polymer is purified by washing with water to remove polyvinyl alcohol and then extracted with nitrobenzene to remove homopoly-DL-phenylalanine. The remaining insoluble polymer is the pure graft polymer.

Poly-DL-phenylalanine-poly-$\gamma$-benzyl-L-glutamate-cellulose acetate graft polymer obtained by grafting polyphenylalanine side chains on a graft polymer of $\gamma$-benzyl-L-glutamate-cellulose acetate, is purified by extraction with chloroform to dissolve unreacted parent graft polymer.

Specific embodiments of this invention are described in the following examples. These examples are merely illustrative, however, and should not be considered as implying any limitations of the scope of this invention. The alkali metal-oxido groups are referred to for short as "alkoxides."

EXAMPLE 1

Preparation of graft polymer of poly-$\gamma$-benzyl-L-glutamate on cellulose acetate All reagents were dried before use, and the reaction carried out under a nitrogen atmosphere.

Cellulose acetate (having an acetyl content of 39.5%) (0.5 g.) was dissolved in dimethylsulfoxide (65 ml.) at room temperature. 2.5 ml. of 0.106 N solution of lithium naphthalene in tetrahydrofuran was added with stirring. The green colour of the lithium naphthalene disappeared almost immediately due to formation of the alkoxide groups on the cellulose acetate, and the viscosity of the solution increased. A solution of 3 g. N-carboxyanhydride of $\gamma$-benzyl-L-glutamate in 10 ml. dimethylsulfoxide was added in one portion with stirring. Carbon dioxide was evolved due to polymerization of the N-carboxyanhydride, and the viscosity of the reaction mixture decreased initially, but increased afterwards due to formation of the graft polymer. The reaction mixture was left for two days at room temperature, acidified with a drop of methanolic hydrochloric acid, and the polymer was precipitated by methanol. The polymer was filtered and dried. The yield was 2.5 g. of which 2 g. are poly-$\gamma$-benzyl-L-glutamate, showing that 80% of N-carboxyanhydride was polymerized. The polymer obtained contained 5.1% nitrogen which also corresponds to 2 g. grafted poly-$\gamma$-benzyl-L-glutamate. The polymer was subjected to successive extractions with acetone-petroleum ether (B.P. 60–80° C.) (1:1) in which the cellulose acetate used is soluble. 0.058 g. polymer was extracted which contained the same nitrogen content as the parent polymer showing that no free cellulose acetate was present in the polymer. The polymer was then extracted with benzene in which poly-γ-benzyl-L-glutamate is soluble but no polymer was extracted. This shows that the polymer obtained is a pure graft polymer of poly-γ-benzyl-L-glutamate on cellulose acetate with no homopolymers. The graft polymer showed characteristic infrared absorptions of both cellulose acetate and poly-γ-benzyl-L-glutamate. It gave a positive biuret reaction, showing the presence of the polypeptide side chains. The polymer on titration with anhydrous 0.1 N perchloric acid in acetic acid (M. Sela and A. Berger, J. Amer. Chem. Soc., 77, 1893, (1955)) for the determination of terminal amino groups showed that the polymeric side chains had an average degree of polymerization of 38. This compares favourably with the molar ratios of N-carboxyanhydride to alkoxide of 43 used.

EXAMPLE 2

Preparation of graft polymer of poly-S-benzyl-L-cysteine on cellulose acetate

Cellulose acetate (acetyl content 39.5%) (0.5 g.) was dissolved in 50 ml. dimethylformamide, and 1 ml. of 0.4 N potassium naphthalene in tetrahydrofuran was added at room temperature with stirring. The colour of the potassium naphthalene disappeared immediately as before and 1.77 g. N-carboxyanhydride of S-benzyl-L-cysteine was added with stirring. In a few minutes the graft polymer started to precipitate from solution. The reaction mixture was stirred for two days, and the crude graft polymer precipitated completely by ethanol; yield 1.7 g. (83%) of which 1.2 g. are grafted poly-S-benzyl-L-cysteine. The polymer contained 5.3% nitrogen which corresponds to 70% grafted poly-S-benzyl-cysteine. This is in agreement with the amount of grafted polyamino acid as calculated from the yield. The polymer was extracted with acetone and 30% of unreacted cellulose acetate were collected on evaporation of the acetone. The extracted cellulose acetate contained no nitrogen. The remaining polymer contained 6.5% nitrogen which corresponds to a graft polymer having 85% grafted polyamino acid side chains.

EXAMPLE 3

Preparation of graft polymer of poly-DL-phenylalanine on hydroxyethyl cellulose

Hydroxyethyl cellulose, "Cellosize" (1 g.) was dissolved in dimethylsulfoxide (100 ml.) and 0.8 ml. of 0.76 N potassium naphthalene in tetrahydrofuran was added. After disappearance of the green colour of the potassium naphthalene, 3 g. of N-carboxyanhydride of phenylalanine were added with strong stirring. The reaction mixture became very viscous and there was no precipitation of polymer. It was kept for three days and the polymer was precipitated with methanol; yield 2.8 g., percent N of polymer=5.9. It was purified by extraction with water which dissolves hydroxyethyl cellulose, but nothing was extracted showing that no unreacted hydroethyl cellulose remained. The polymer was then dried and extracted with nitrobenzene in which polyphenylalanine is soluble, but no polymer was extracted showing that the polymer obtained is the pure graft polymer, uncontaminated with homopolymers.

EXAMPLE 4

Preparation of graft polymer of poly-DL-phenylalanine, on poly-γ-benzyl-L-glutamate-cellulose acetate graft polymer 0.743 g. of the graft polymer of poly-γ-benzyl-L-glutamate-cellulose acetate prepared in Example 1 was dissolved in 50 ml. dimethylformamide and 0.9 ml. of 0.37 N potassium naphthalene added, followed by 1.89 g. N-carboxyanhydride of phenylalanine. After several minutes, the new graft polymer began to precipitate. The reaction mixture was left at room temperature for 24 hours and the crude graft polymer precipitated by ethanol, yield 1.72 g. The polymer was extracted with chloroform in which the parent graft polymer of poly-γ-benzyl-L-glutamate-cellulose acetate is soluble; 0.042 g. was extracted corresponding to about 7% of the parent graft polymer which did not react. The rest of the parent graft polymer (0.701 g.) was incorporated in the new graft polymer of poly-DL-phenylalanine-poly-γ-benzyl-L-glutamate-cellulose acetate.

EXAMPLE 5

Preparation of graft polymer of copolymers of γ-benzyl-L-glutamate and DL-phenylalanine on cellulose acetate Cellulose acetate (39.5% acetyl) (0.512 g.) was dissolved in 50 ml. dimethylformamide and 0.75 ml. of 0.4 N potassium naphthalene added. The colour disappeared almost immediately, and a solution of 1.3 g. N-carboxyanhydride of γ-benzyl-L-glutamate and 1 g. N-carboxyanhydride of phenylalanine (molar ratio 1:1) in 10 ml. dimethylformamide was added. The graft copolymer is soluble in dimethylformamide, and during the polymerization there is a large increase in the viscosity of the polymerization mixture. The polymer was precipitated after two days by addition of methanol, yield 1.79 g., percent N=5.6.

EXAMPLE 6

Preparation of graft polymer poly-DL-phenylalanine poly vinyl alcohol

Poly vinyl alcohol (0.927 g.) was dissolved in 50 ml. dimethylsulfoxide with strong stirring. 1 ml. of 0.37 N potassium naphthalene was added, followed by 3.02 g. N-carboxyanhydride of DL-phenylalanine. Carbon dioxide was evolved and the graft polymer started to precipitate. After 48 hours the polymer was completely precipitated by methanol and filtered; yield 2.7 g., percent N=6.1. The crude graft polymer was extracted with water and 2.7% of unreacted poly vinyl alcohol were collected while all the rest was grafted. The graft polymer was then extracted with nitrobenzene and no homo polyphenylalanine was extracted, showing that all of it was incorporated in the graft polymer.

EXAMPLE 7

Preparation of graft polymer of poly-DL-phenylalanine on graft polymer of poly methacrylonitrile-cellulose acetate Graft polymer of poly methacrylonitrile-cellulose acetate (0.75 g.) prepared by graft polymerization of methacrylonitrile on cellulose acetate and suitable purification was dissolved in 50 ml. dimethylsulfoxide and 0.6 ml. of 0.66 N potassium naphthalene was added. N-carboxy anhydride of phenylalanine (2.79 g.) was added with stirring. After 48 hours the polymer was precipitated with methanol. Yield 2.6 g. This corresponds to 77% yield in grafted polyphenylalanine. 1.529 g. of the polymer were extracted with acetone in which the graft methacrylonitrile-cellulose acetate is soluble. 0.179 g. was dissolved, i.e. 39% of the parent graft polymer was not grafted. The original polymer was extracted with nitrobenzene and nothing was extracted showing that no homo poly-DL-phenylalanine was formed.

EXAMPLE 8

Effect of the molar ratio of N-carboxyanhydride to initiator on the molecular weight of the graft side chains Graft polymers of γ-benzyl-L-glutamate on cellulose acetate were prepared and purified as described in Example 1. The graft polymers were titrated for terminal amino groups according to M. Sela and A. Berger, J. Amer. Chem. Soc., 77, 1893 (1955) and their molecular weights calculated. The results are given in the following table:

N-carboxyanhydride/initiator:                D.P.

| | |
|---|---|
| 10.0 | 15.5 |
| 31.6 | 23.1 |
| 43.0 | 38 |
| 54.0 | 47.3 |

The amount of the initiator is equivalent to the amount of alkoxide units on the polymer backbone, which in turn is equal to the amount of the alkali metal naphthalene added.

D.P. is the average degree of polymerization of the poly-γ-benzyl-L-glutamate as calculated from the equation:

$$D.P. = \frac{\text{Percent total nitrogen}}{\text{Percent terminal nitrogen}}$$

The total nitrogen was obtained by elementary analysis and the terminal nitrogen by titration.

From this example it is seen that D.P. is controlled by the ratio of N-carboxyanhydride to initiator used, generally increasing with higher ratios.

EXAMPLE 9

Preparation of graft polymer poly-DL-phenylalanine on methyl cellulose

Methyl cellulose containing 24.6% OMe (0.492 g.) was dissolved in dimethylsulfoxide (40 ml.) and 1 ml. of 0.925 N sodium naphthalene was added. A gel was formed and N-carboxyanhydride of DL-phenylalanine (2.97 g.) was added. The reaction mixture was left for three days, and polymer precipitated by ethanol, yield 2.5 g., percent N=7.2. This corresponds to 88% yield based on the N-carboxyanhydride. The polymer was extracted with water to remove unreacted methyl cellulose, but nothing was extracted, showing that all the methyl cellulose was converted to graft polymer.

EXAMPLE 10

Preparation of graft polymer of poly-DL-phenylalanine on nitrocellulose

Nitrocellulose (12.8% nitrogen) (0.424 g.) was dissolved in tetrahydrofuran (50 ml.), and 0.5 ml. of 0.925 N sodium naphthalene was added. The green colour of the sodium naphthalene disappeared and 2.89 g. N-carboxyanhydride of DL-phenylalanine was added. The reaction mixture was left for three days and the polymer was precipitated by ethanol; yield 1.8 g. corresponding to 62% yield of N-carboxyanhydride that polymerized. The polymer was extracted with acetone to remove unreacted nitrocellulose. Thus, 18% of the nitrocellulose was extracted, the rest being converted to graft polymer.

EXAMPLE 11

Preparation of graft polymer of poly-DL-phenylalanine on cellulose acetate, using the free hydroxyl groups as initiators Cellulose acetate (0.54 g.) was dissolved in dimethylsulfoxide (50 ml.) and N-carboxyanhydride of phenylalanine (2.44 g.) was added. The solution was heated to 90° C. for 15 minutes until the appearance of slight cloudiness and then was cooled to room temperature. The reaction mixture was left to stand for four days and the polymer was precipitated by methanol; yield 1.72 g., per cent N=3.7. This corresponds to 35% yield with respect to the N-carboxyanhydride. The crude polymer (0.961 g.) was extracted with acetone to remove unreacted cellulose acetate; 0.5 g. having 1.6% nitrogen was extracted. This corresponds to cellulose acetate polymer contaminated with some graft polymer. The graft polymer insoluble in acetone had 7.8% nitrogen.

In a similar experiment carried out at room temperature for several days, the graft polymer was obtained in a very small yield, while in a similar experiment carried out at 90° C., the graft polymer was obtained in low yield.

EXAMPLE 12

Preparation of graft polymer of DL-phenylalanine on starch

The dry alkoxide derivative of starch was prepared by the reaction of sodium metal (0.4 g.) in liquid ammonia with starch (1.25 g.) followed by complete evaporation of the ammonia. It was suspended in dimethylformamide (50 ml.) and N-carboxyanhydride of DL-phenylalanine (2.03 g.) added. The reaction mixture was stirred for two days and poured into ethanol; yield 2.36 g., 4.8% N. The crude polymer (0935 g.) was extracted with water to remove unreacted starch, which is water-soluble. 0.52 g. of the polymer was not dissolved, percent N=8.4. The soluble material had traces of nitrogen, and consisted of starch that was not grafted. The insoluble polymer contained 18% of the starch, which was incorporated in the graft polymer. The insoluble polymer was extracted with nitrobenzene, but nothing was extracted, showing that the poly-DL-phenylalanine is part of a graft polymer with the starch.

EXAMPLE 13

Preparation of graft polymer consisting of a block copolymer of DL-phenylalanine and γ-benzyl-L-glutamate on cellulose acetate Graft polymer of γ-benzyl-L-glutamate on cellulose acetate (1.075 g.), having percent nitrogen 5.35 and D.P. of the side chain 23, was dissolved in dimethylsulfoxide (44 ml.). N-carboxyanhydride phenylalanine (2.013 g.) was added and the reaction mixture stirred at room temperature for three days. The polymer was precipitated by ethanol, yield 2.2 g. (percent N=7.0); yield is 77% based on the N-carboxyanhydride. The increase in weight is due to the phenylalanine which polymerized on the terminal amino groups present in the side chains of the graft polymer. The polymer (1.094 g.) was extracted with tetrahydrofuran for 24 hours and 0.304 g. polymer was extracted, percent N=5.4, which is essentially unreacted graft polymer of γ-benzyl-L-glutamate on cellulose. This is equivalent to 57% unreacted graft polymer. The insoluble polymer was extracted with nitrobenzene to remove homopolyphenylalanine but essentially nothing was extracted, showing that all the polyphenylalanine was incorporated in the graft polymer, percent N of graft polymer 7.5%.

EXAMPLE 14

Preparation of graft polymer of DL-phenylalanine on soluble starch

Soluble starch (0.527 g.) was dissolved in dimethylsulfoxide (50 ml.) and 5 ml. of sodium naphthalene (0.9 N) was added. When the green colour of the sodium naphthalene disappeared, N-carboxyanhydride of DL-phenylalanine (3 g.) was added. The reaction mixture was left for three days and the polymer was precipitated by ethanol; yield based on N-carboxyanhydride, 78%. The polymer was extracted with hot water to remove unreacted starch; 16% of the starch was thus extracted, the rest being converted to graft polymer.

EXAMPLE 15

Preparation of graft polymer of N-benzyl-β-alanine on cellulose acetate

Cellulose acetate (39.5% acetyl) (0.418 g.) was dissolved in dimethylsulfoxide (50 ml.) and sodium naphthalene (0.76 N, 1.0 ml.) was added. N-carboxyanhydride of N-benzyl-β-alanine (2.03 g.) was added, and the reaction mixture was stirred and left at room temperature for three days. The polymer was precipitated with ethanol; yield 1.1 g. The polymer was extracted with tetrahydro-

11 furan, in which cellulose acetate is soluble, but no cellulose acetate was extracted, showing that all of it was incorporated in the graft polymer.

EXAMPLE 16

Preparation of graft polymer of poly ε-N-carbobenzoxy-L-lysine on cellulose acetate.

Cellulose acetate (acetyl content 39.5%) (0.5 g.) was dissolved in 100 ml. dry dioxan and 3.5 ml. of 0.0363 N sodium naphthalene in tetrahydrofuran was added at room temperature with stirring The colour of the sodium naphthalene disappeared immediately and 3.0 g. of N-carboxyanhydride of ε-N-carbobenzoxy-L-lysine was added. The reaction mixture was stirred for two days and the graft polymer precipitated completely by ethanol. The yield was 3 g. and 98% of the N-carboxanhydride was graft polymer contained 8.3% N. The polymer on titration with anhydrous 0.1 N perchloric acid in acetic acid (M. Sela and A. Berger, J. Amer. Chem. Soc., 77, 1893 (1955)) for the determination of terminal amino groups showed that the polymeric side chains had an average degree of polymerization of 67. This compares favourably with the used molar ratios of N-carboxyanhydride to alkoxide of 74.

EXAMPLE 17

Preparation of graft polymer of poly L-lysine on cellulose acetate

The graft polymer of poly ε-N-carbobenzoxy-L-lysine on cellulose acetate (nitrogen content 8.3%) was treated with a solution of 33% hydrobromic acid in glacial acetic acid. The reaction mixture was kept at room temperature for 10 minutes. The polymer was isolated and washed with ether.

The polymer had a ratio of total nitrogen to amino nitrogen of 2 which is in accordance with a graft polymer of poly-L-lysine on cellulose acetate.

EXAMPLE 18

Preparation of a graft polymer of poly ε-N-carbobenzoxy-L-lysine on cellulose

This graft polymer was prepared by the reaction of cellulose xanthate with the N-carboxyanhydride of ε-N-carbobenzoxy-L-lysine. The resulting graft polymer on the cellulose xanthate was converted to the graft polymer of poly ε-N-carbobenzoxy-L-lysine on cellulose by the usual treatment with acid (Ott, Spurling and Graffin, "Cellulose," vol. II, 2nd ed., Intersc. Publ., New York, 1954 of 1009).

2 g. α-cellulose were suspended in 50 ml. of sodium hydroxide solution (18%) and stirred for one hour at room temperature. The swollen alkali cellulose was isolated by filtration and was pressed until its weight was reduced to 6 g. After ageing for one day, the alkali cellulose was reacted with 0.6 ml. carbon disulfide, and the reaction mixture was shaken at room temperature. The cellulose became orange in colour, and after five hours the remaining carbon disulfide was removed in vacuum, and the residual xanthate was stirred for twelve hours in dimethylsulfoxide (60 ml.). Water (30 ml.) was then added, and most of the cellulose xanthate dissolved. ε-N-carbobenzoxy-L-lysine N-carboxyanhydride (1 g.) was added and the reaction mixture was stirred at room temperature for half an hour. It was added to 500 ml. of sulfuric acid solution (10%) containing 70 g. of sodium sulfate. In this acid solution the xanthate decomposed and the cellulosic material was regenerated. The solution was filtered, washed with water to pH 7, then with alcohol to remove any remaining N-carboxyanhydride, and then was dried on phosphorus pentoxide in vacuo. The polymer is free from ε-N-carbobenzoxy-L-lysine (which could have been formed as a result of possible decomposition of the N-carboxyanhydride on reaction with alkali or water) since it was obtained in a strongly acid solution which

12 dissolves the amino acid. The material (2.4 g.) was extracted with dioxan to remove any homopoly ε-N-carbobenzoxy-L-lysine present; only a few milligrams material were extracted. The remaining material was the graft polymer of poly ε-N-carbobenzoxy-L-lysine on cellulose. It contained 1.8% nitrogen. 50% of the N-carboxanhydride was polymerized and essentially all of it was grafted on the cellulose. The graft polymer contained about one part polypeptide to four parts cellulose.

In a similar experiment in which the alkali cellulose was aged for three days and the xanthate was stirred for one hour in pure dimethylsulfoxide, a graft polymer was obtained which contained 3.1% nitrogen. The yield based on the N-carboxyanhydride was about 90%. No homopoly ε-N-carbobenzoxy-L-lysine was formed. The graft polymer contained about one part polypeptide to two parts cellulose.

What is claimed is:

1. A graft copolymer of a synthetic polyamino acid on a polyhydroxy polymer comprising a polyhydroxy polymer backbone having polypeptide chains grafted thereon through the oxygen atoms of the hydroxy groups in a solution reaction thereby yielding a substantially uniform distribution of said grafts in said backbone polymer, having the representative formula:

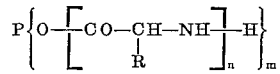

where $m$ is a positive integer, $n$ is at least 2, P is a polymer having hydroxyl groups and R is H or an hydrocarbon radical and wherein said polyhydroxy polymer is selected from the group consisting of cellulose polymers, starch polymers, polyvinyl alcohol, polyglycol ethers having hydroxyl groups, and polyhydroxy polymers having a member of the group consisting of polymethyl methacrylate, polyacrylonitrile, polymethacrylonitrile and polyethylene oxide grafted thereon.

2. A graft polymer in accordance with claim 1, wherein said amino acids are poly-alpha-amino acids, the alpha-amino acids being selected from the group consisting of monofunctional and polyfunctional alpha-amino acids.

3. A graft copolymer according to claim 1 wherein said polyhydroxy polymer is cellulose acetate.

4. A graft copolymer according to claim 1 wherein said polyhydroxy polymer is nitrocellulose.

5. A graft copolymer according to claim 1 wherein said polyhydroxy polymer is starch.

6. A graft copolymer according to claim 1 wherein said polyhydroxy polymer is a starch derivative.

7. A graft copolymer according to claim 1 wherein said polyhydroxy polymer is polyvinyl alcohol.

8. A graft copolymer according to claim 1 wherein said polyhydroxy polymer is a polyalkylene glycol.

9. A graft copolymer according to claim 1 wherein the reaction is carried out with polyamino acids which are copolymers of at least two different amino acids.

10. A graft copolymer according to claim 1 wherein said polyhydroxy polymer backbone is itself a graft copolymer of a member of the group consisting of polymethyl methacrylate, polyacrylonitrile, polymethacrylonitrile and polyethyleneoxide grafted onto a polyhydroxy polymer.

11. A method for the preparation of a graft polymer of the representative formula

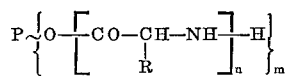

where $m$ is a positive integer, $n$ is at least 2, P is a polymer having hydroxyl groups and R is H or an hydrocarbon radical comprising:

dissolving a polyhydroxy polymer having free —OX groups thereon, where X is hydrogen or an alkali metal, in an organic solvent selected from the group consisting of tetrahydrofuran, dimethylformamide, dimethylsulfoxide and ethers, and reacting said polymer with at least one amino acid N-carboxyanhydride which graft polymerizes onto said polyhydroxy polymer at said free —OX groups to form polypeptide chains pendant from the polyhydroxy polymer backbone through the oxygen atoms of the hydroxy groups.

12. The method according to claim 11, wherein the reaction is carried out with a mixture of N-carboxyanhydrides of at least two different amino acids.

13. The method according to claim 11, wherein the reaction is carried out in successive steps using in each step an N-carboxyanhydride of a different amino acid.

14. A method in accordance with claim 11 wherein said polyhydroxy polymer having —OH groups thereon is converted to the corresponding alkali metal oxide derivative, wherein X is an alkali metal, prior to said reacting said polyhydroxy polymer with said amino acid N-carboxyanhydride.

15. A method in accordance with claim 14 wherein said conversion to the alkali metal oxide derivative comprises reacting said polyhydroxy polymer with an addition compound of an alkali metal with a polycyclic aromatic hydrocarbon.

16. A method in accordance with claim 14 wherein said conversion to the alkali metal oxide derivative comprises reacting said polyhydroxy polymer with an alkali metal alkoxide.

References Cited

UNITED STATES PATENTS 2,327,162   8/1943   Baldwin et al.

OTHER REFERENCES

Die Makromolekulare Chemie 18/19, 332–341 (1956), "Graft- and Block-Polymers from Synthetic and Natural Macromolecules," Immerqut et al. (copy Scientific Lib.) (English translation in 260/875).

WILLIAM H. SHORT, *Primary Examiner.*

E. M. WOODBERRY, *Assistant Examiner.*

U.S. Cl. X.R.

260—13, 17.4, 77.5, 78, 857, 874